Patented Jan. 13, 1942

2,270,168

UNITED STATES PATENT OFFICE 2,270,168

VAT DYESTUFFS OF THE ANTHRAQUINONE SERIES

Walter Mieg, Opladen, and Franz Wieners, Cologne-Stammheim, Germany, assignors to General Aniline & Film Corporation, a corporation of Delaware No Drawing. Application June 22, 1938, Serial No. 215,210. In Germany June 29, 1937

2 Claims. (Cl. 260—316)

The present invention relates to new vat dyestuffs of the anthraquinone series.

We have found that new and valuable vat dyestuffs of the anthraquinone series are obtained by causing poly-(anthraquinonyl.NH)-aryls which contain in at least one of the anthraquinonyl radicals an acyl amino group attached thereto or an acridone ring condensed therewith to react with sulfuric acid or chlorosulfonic acid.

Our new compounds represent carbazoles of amines corresponding to the following general formula R—(NH.A)$_n$ in which R represents an aryl radical, $n$ stands for the numbers 2 or 3 and A represents α-anthraquinone radicals, at least one of which is substituted in at least one of the α-positions by an acyl amino group or has combined therewith a radical of the following general formula:

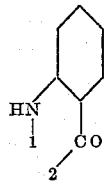

wherein the symbols 1 and 2 indicate that the free bonds are connected with the 1- and 2-positions of the anthraquinone. It is to be understood that also those compounds fall into the scope of our present invention which contain in the molecule both an anthraquinone radical being substituted by an acyl amino group and an anthraquinone radical having condensed therewith a radical of the formula as indicated above.

As aryl radicals there may be present any aromatic radical, for instance a benzene, diphenyl or naphthalene radical. Compounds containing a benzene radical are, however, of special importance. As acyl amino groups there come into consideration aroyl amino groups, especially benzoylamino groups; aliphatic acylamino groups, however, as for example the acetyl amino group are not to be excluded.

The reaction of the amines of the above mentioned type with sulfuric acid or chlorosulfonic acid occurs even at low temperature and is in most cases finished after few hours. Temperatures above about 50° C. are generally to be avoided since in some cases sulfonation or saponification reactions are effected thereby.

The reaction may be accelerated by the presence of catalytically small amounts of reducing agents, such as copper powder, zinc powder or hydroquinone. When working with sulfuric acid there are primarily obtained intermediate products of a higher hydrogen content and in order to convert them into the final products they have to be subjected to an oxidizing after-treatment with, for instance nitrite, bichromate, iron chloride, or superoxides. Our new dyestuffs as well as the intermediate products of the higher hydrogen content may be employed for dyeing and printing purposes. Depending on the components used as starting materials they show brown, currant or gray shades of excellent fastness properties.

The following examples illustrate the invention without, however, restricting it thereto, the parts being by weight:

Example 1

60 parts of the condensation product obtained from 1 mol of m-dichlorobenzene and 2 mols of 1-amino-4-benzoylamino anthraquinone, of the following formula:

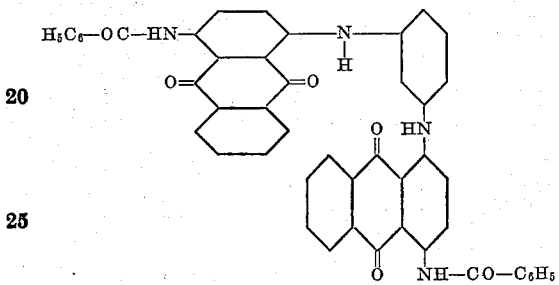

are dissolved at 10° C. in 1000 parts of chlorosulfonic acid. After adding 0.5 part of copper powder, the solution is allowed to stand at room temperature for about 15 hours while stirring, until a test portion taken therefrom is soluble in concentrated sulfuric acid with a deep bluish green coloration and yields a violetish brown precipitation when pouring it into water. Thereupon it is either mixed with concentrated sulfuric acid and then poured into ice, or it is directly poured into ice and the paste thus obtained is then heated to about 70° C. while adding sodium bichromate or nitrite in an amount necessary for effecting oxidation of the intermediate product which may be present in the reaction mixture. The dyestuff thus obtained having the following probable formula:

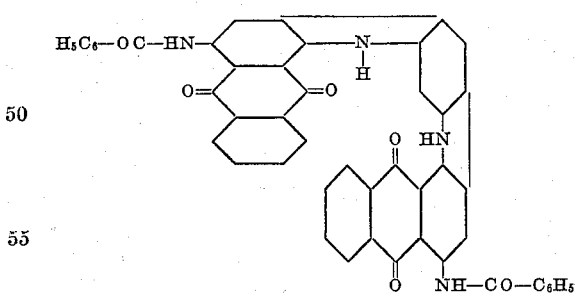

is soluble in concentrated sulfuric acid with a deep bluish green coloration and dyes cotton from the warm or cold vat strong currant shades of good fastness properties. The product can be brominated by gradually adding at from 5 to 10° C. into a chlorosulfonic acid solution of 25 parts of the dyestuff, 15 parts of bromine dissolved in chlorosulfonic acid and 0.1 part of iodine. After stirring for some hours at the same temperature the solution is poured onto ice, a bromine-containing product being thus obtained which yields shades of a more brownish currant shade than the starting material and shows similar fastness properties.

Example 2

10 parts of the condensation product obtainable from 1 mol of m-dichlorobenzene and 2 mols of 1-amino-5-benzoylamino anthraquinone of the following formula:

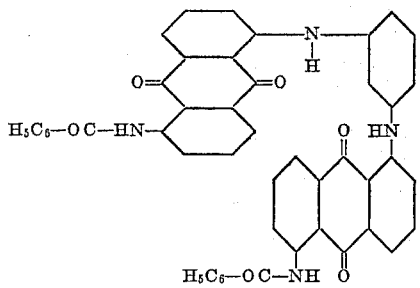

are dissolved at 0–5° C. in 140 parts of sulfuric acid of 66° Bé. This solution is then stirred, after addition of some copper powder, for about 5 hours at the same temperature and then at room temperature, until the precipitation of brown needles increases. Thereupon the reaction liquor is filtered by suction, and the intermediate product thus isolated is stirred with dilute sulfuric acid and heated for some time to 70–80° C. after the addition of 2 parts of sodium bichromate. The dyestuff thus obtained having the following probable formula:

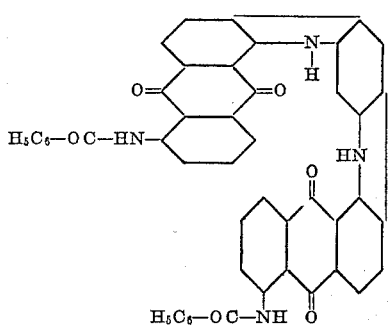

dyes cotton, especially from the warm vat strong clear reddish brown shades of good fastness properties, whereas the starting material only yields weak and dull Bordeaux-red shades. The dyestuff is soluble in concentrated sulfuric acid with intensive greenish blue coloration.

A similar dyestuff is obtained when causing chlorosulfonic acid instead of sulfuric acid to react upon the starting material as in Example 1.

When introducing bromine into the reaction mixture as described in Example 1 a dyestuff of a more yellowish brown shade is obtained.

Example 3

A solution of 10 parts of the condensation product from 1 mol of m-dichlorobenzene and 1 mol of 1-amino-4-benzoylamino- and 1 mol of 1-amino-5-benzoylaminoanthraquinone in 120 parts of chlorosulfonic acid is allowed to stand at 15–20° C. until a test portion is soluble in concentrated sulfuric acid with an intensive bluish green coloration and yields a reddish brown precipitate when pouring it into water. After working up as described in Example 1, a carbazole is obtained which is soluble in concentrated sulfuric acid with a bluish green coloration and which dyes from the cold and from the hot vat strong dark-reddish brown shades of good fastness properties.

Example 4

A solution of 20 parts of the condensation product from 1 mol of p-dibromobenzene and 2 mols of 1-amino-5-benzoylamino anthraquinone of the following formula:

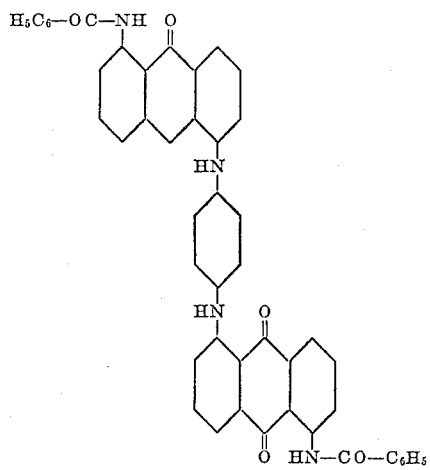

in 300 parts of chlorosulfonic acid are stirred after the addition of some copper powder for about 24 hours at 10–15° C. while excluding moisture, whereupon it is mixed with concentrated sulfuric acid and poured onto ice. After adding to the acid paste thus obtained about 3 parts of sodium bichromate it is heated to 70–80° C. while stirring. The product thus obtained having the following probable formula:

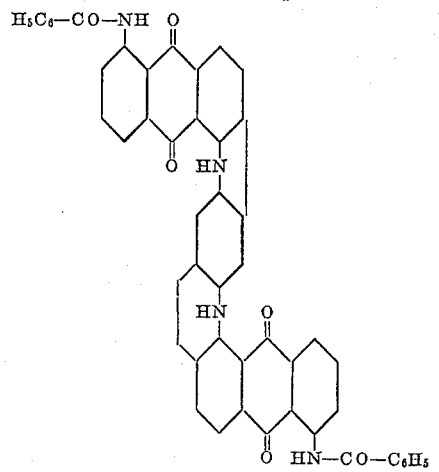

is washed with water until neutral. It is soluble in concentrated sulfuric acid with a dark blue coloration. It dyes cotton from a red vat strong yellowish brown shades of good fastness properties. When brominating the product of this example in a chlorosulfonic acid solution a dyestuff of a similar shade but of a still improved fastness to chlorine is obtained.

Example 5

30 parts of the condensation product from 1 mol of m-dichlorobenzene with 1 mol of 4-amino-5'-chloroanthraquinone-2.1-(N)-1'.2'-(N)-benzeneacridone and 1 mol of 1-amino-5-benzoylamino anthraquinone are stirred into 500 parts of chlorosulfonic acid. After the addition of some copper powder or zinc powder the solution is kept at 20–25° C. while stirring until the dark blue color of a sample saddens no more when in sulfuric acid. After stirring the whole into ice-water the quantity of nitrite or bichromate which is necessary for oxidation is added and the whole heated to 70–80° C. The reaction product thus obtained yields strong, currant brown vat dyeings.

In sulfuric acid, carbazolation also occurs, but more slowly.

Example 6

A chlorosulfonic acid solution of the condensation product obtainable from 1 mol of m-dichlorobenzene and 2 mols of 4-amino-5'-chloroanthraquinone - 2.1-(N)-1'.2'-(N)-benzeneacridone of the following formula:

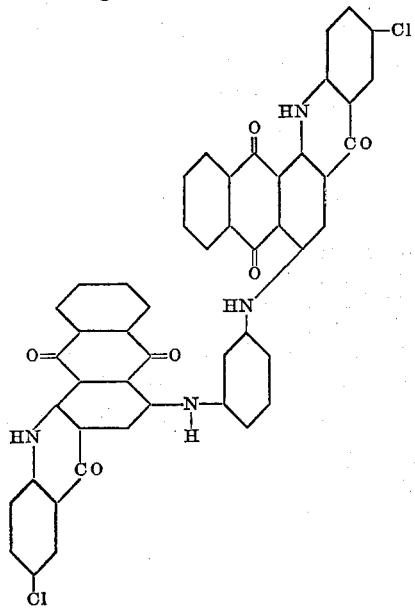

is heated to 25–30° C. for about 20 hours while adding small quantities of copper. The condensation product thus formed having the following probable formula:

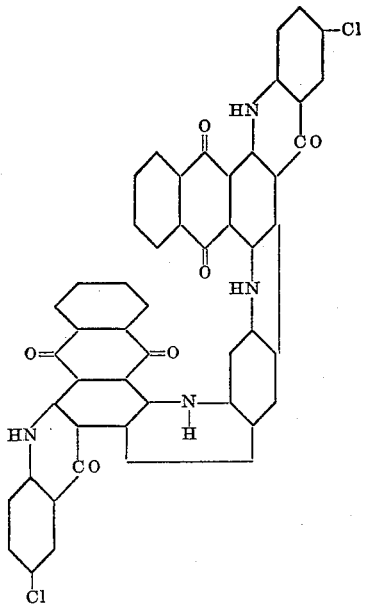

dyes cotton strong blue-gray shades.

Example 7

A chlorosulfonic acid solution of the condensation product of 1 mol of 1,4-dichloronaphthalene and 2 mols of 1-amino-5-benzoylamino anthraquinone of the following formula:

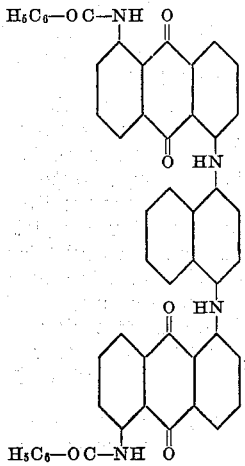

is kept at 3–6° C. for about 5 hours. After stirring the whole into ice-water excess iron chloride is added whereupon the solution is heated for a short time to 80° C.; a dyestuff being thus obtained having the following probable formula:

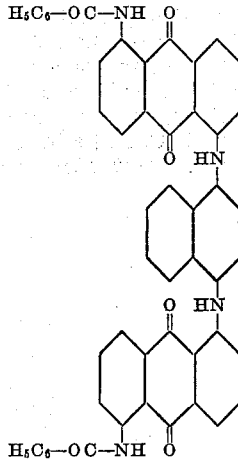

which dyes cotton from a reddish brown vat yellowish brown shades of good fastness properties.

Example 8

10 parts of the condensation product from 1 mol of 4,4'-dibromodiphenyl and 2 mols of 1-amino-5-benzoylamino anthraquinone are dissolved at 0–2° C. in 150 parts of chlorosulfonic acid; the solution is stirred for about 3 hours at the same temperature while excluding moisture. After working up the dark blue melt in the manner described in Example 1 a yellowish brown vat dyestuff of good fastness properties is obtained.

The same dyestuff is obtained when carrying through the condensation in strong cold sulfuric acid and oxidizing the primarily formed intermediate product in an acid medium.

Example 9

35 parts of the compound obtainable from 1 mol of m-dichlorobenzene and 1 mol of 1-aminoanthraquinone and 1 mol of 1-amino-5-benzoylamino anthraquinone, are dissolved in about 400 parts of chlorosulfonic acid while cooling by means of ice, whereupon the solution is allowed to stand until a test portion is soluble in concentrated sulfuric acid with a dark blue coloration. On working up the product as described in Example 1 a reddish brown vat dyestuff is obtained.

*Example 10*

Into 200 parts of sulfuric acid of 98% there are introduced, at about 20° C., 2 parts of hydroquinone and 30 parts of the condensation product from 1 mol of 1,3,5-tribromobenzene and 3 mols of 1-amino-5-benzoylamino anthraquinone. The solution gradually assumes a dull olive coloration. After about 24 hours' stirring at room temperature it is poured onto ice, whereupon after the addition of some nitrite the suspension is heated to boiling. For completing the oxidation stirring may be continued for about 1 hour at 70° C. after the addition of 3 parts of bichromate. On filtering and rinsing a reddish brown paste is obtained which can directly be used for the dyeing and which dyes cotton from the vat reddish brown shades of good fastness properties.

The reaction is accelerated when using chlorosulfonic acid instead of sulfuric acid.

*Example 11*

300 parts of chlorosulfonic acid are stirred together with 0.5 part of copper powder and heated to 40° C. whereupon 20 parts of the condensation product from 1 mol of tribromobenzene and 3 mols of 1-amino-4-benzoylamino anthraquinone are introduced. After five hours' stirring at 40° C. the melt is poured in concentrated sulfuric acid and then into water in which is dissolved 5 parts of sodium bichromate. Thereupon the mixture is heated to 70° C. and stirred at this temperature for 1 hour. After filtering and rinsing a Bordeaux-red paste is obtained which may easily be vatted, cotton being dyed from this vat clear currant shades of good fastness properties. The dyestuff represents a Bordeaux-red powder which is soluble in concentrated sulfuric acid with an emerald-green coloration, when pouring it into water it precipitates in form of Bordeaux-red flakes.

The reaction may also be carried out with sulfuric acid as is described in Example 10.

We claim:

1. The carbazole of the amine of the following formula

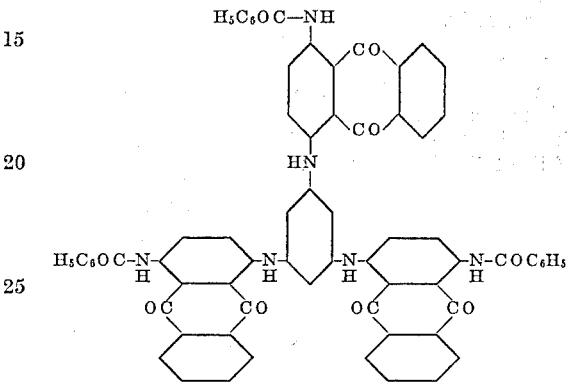

2. Carbazoles of amines of the following general formula: $1.3,5-(NH-A)_3 \equiv R$ wherein R represents a phenylene radical and A represents alpha-anthraquinone radicals, at least one of which is substituted in at least one alpha-position by a benzoyl-amino group.

WALTER MIEG.
FRANZ WIENERS.